(12) United States Patent
Wynnyczenko et al.

(10) Patent No.: US 12,137,507 B2
(45) Date of Patent: Nov. 5, 2024

(54) LIGHTING TECHNOLOGY DEVICE

(71) Applicant: Tridonic GmbH & Co KG, Dornbirn (AT)

(72) Inventors: Oliver Wynnyczenko, Lustenau (AT); Thomas Zengerle, Kennelbach (AT)

(73) Assignee: Tridonic GmbH & Co KG, Dornbirn (AT)

( * ) Notice: Subject to any disclaimer, the term of this patent is extended or adjusted under 35 U.S.C. 154(b) by 151 days.

(21) Appl. No.: 17/786,606

(22) PCT Filed: Nov. 23, 2020

(86) PCT No.: PCT/EP2020/083083
§ 371 (c)(1),
(2) Date: Jun. 17, 2022

(87) PCT Pub. No.: WO2021/121878
PCT Pub. Date: Jun. 24, 2021

(65) Prior Publication Data
US 2023/0013250 A1    Jan. 19, 2023

(30) Foreign Application Priority Data

Dec. 19, 2019    (EP) .................................... 19217938

(51) Int. Cl.
*H01Q 7/08* (2006.01)
*H04B 5/72* (2024.01)
*H04W 4/80* (2018.01)
*H05B 47/19* (2020.01)

(52) U.S. Cl.
CPC ............... *H05B 47/19* (2020.01); *H01Q 7/08* (2013.01); *H04B 5/72* (2024.01); *H04W 4/80* (2018.02)

(58) Field of Classification Search
CPC ............ H05B 47/19; H01Q 7/08; H04B 5/72; H04W 4/80
See application file for complete search history.

(56) References Cited

U.S. PATENT DOCUMENTS 6,069,564 A * 5/2000 Hatano .............. G06K 7/10346
                                                    343/742
2015/0061541 A1    3/2015 Gandini
2018/0048067 A1    2/2018 Zhao et al.

FOREIGN PATENT DOCUMENTS

CN    103390802 B    5/2015
CN    105514596 A    5/2016

OTHER PUBLICATIONS

PCT/EP2020/083083, International Search Report and Written Opinion dated Feb. 3, 2021, 13 pages.

* cited by examiner

*Primary Examiner* — Dieu Hien T Duong
(74) *Attorney, Agent, or Firm* — Andrus Intellectual Property Law, LLP

(57) ABSTRACT

The present disclosure relates to a lighting technology device, comprising a controller, a memory functionally connected to the controller, and an NFC antenna integrated in a casing or arranged on a board carrying the controller and the memory, wherein the antenna comprises two planar antenna wing elements arranged at an angle between 80° and 100°, preferably 85° to 95° with respect to each other, and wherein the controller is configured to process NFC data received from the antenna and store in said memory said data for programming the lighting technology device.

7 Claims, 5 Drawing Sheets

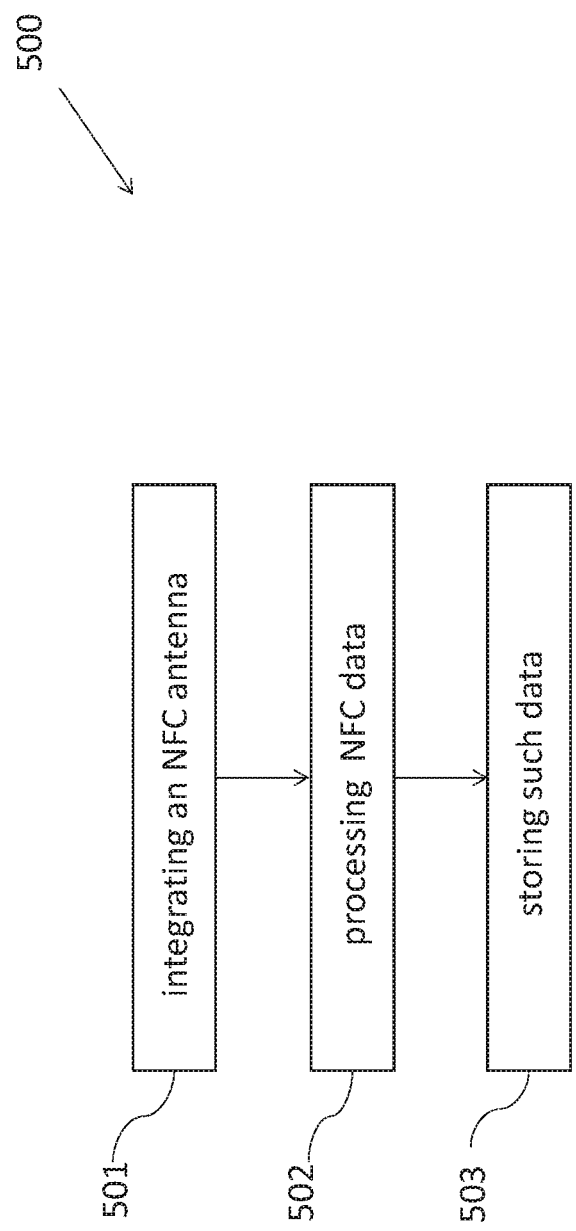

LIGHTING TECHNOLOGY DEVICE

CROSS REFERENCE TO RELATED APPLICATIONS

The present application is the U.S. national stage application of international application PCT/EP2020/083083 filed Nov. 23, 2020, which international application was published on Jun. 24, 2021 as International Publication WO 2021/121878 A1. The international application claims priority to European Patent Application No. 19217938.0 filed Dec. 19, 2019.

TECHNICAL FIELD OF THE INVENTION

The present disclosure relates to the field of lighting technology devices. In particular, the present disclosure relates to the geometrical design of NFC antennas, which are associated with lighting technology devices, such as for example a driver for lighting means or a sensor.

BACKGROUND OF THE INVENTION

With the advent of the digitization of lighting, nowadays many possibilities arise to arrange the lighting, e.g. public street lighting, according to the needs and, thus, in an energy efficient manner.

One major advantage of this is that the electronic components comprised in an application make possible also a subsequent alignment of the light emission efficiency and power consumption as needed. Moreover, system can be configured more individual. It is, e.g., possible that a light is programmed with an autonomous dimming and, depending on the situation, a control phase can be used as a dimming pulse. With this option, the user can, for example, reduce the storage and, depending on the application, install the luminaire from the warehouse.

The disclosure is particularly about the geometrical design of NFC antennas, which are associated with the casing of a light technology device, such as for example a driver for lighting means, a sensor, etc.

With currently known antennas, it is only possible to write data into the device through NFC in predefined configurations of the antenna versus the writing antenna. This NFC transmission is typically used for configuring the lighting device.

Thus, it is an objective of the present invention to provide for an improved geometrical design of NFC antennas, which are associated with the casing of a light technology device.

SUMMARY OF THE INVENTION

The object of the present invention is achieved by the solution provided in the enclosed independent claims. Advantageous implementations of the present invention are further defined in the dependent claims.

According to a first aspect, the invention relates to a lighting technology device, comprising: a controller, a memory functionally connected to the controller, and an NFC antenna integrated in a casing or arranged on a board carrying the controller and the memory, wherein the antenna comprises two planar antenna wing elements arranged at an angle between 80° and 100°, preferably 85° to 95° with respect to each other, and wherein the controller is configured to process NFC data received from the antenna and store in said memory said data for programming the lighting technology device.

This provides the advantage that, with this type of NFC antenna, the programming process is much less sensitive with respect to arrangement between NFC reader and antenna.

Moreover, this has the advantage that an arrangement between NFC reader and antenna is provides which avoids communication problems and can allow the user to successfully program the NFC driver. This, further, allows to successfully program LED drivers via NFC.

In an embodiment of the lighting technology device, the two planar antenna wing elements are preferably arranged at an angle approximatively 90°.

This provides the advantage that, with this type of NFC antenna, the programming process is much less sensitive with respect to arrangement between NFC reader and antenna. Due to the two windings which are placed perpendicular to each other, magnetic coupling to the reader is possible in one additional direction.

In an embodiment of the lighting technology device, a ferrite core is arranged between the two planar antenna wing elements.

This provides the advantage that, in case two conventional NFC antennas are placed perpendicular to each other, disadvantages of this arrangement with respect to achievable coupling factors can be compensated through a ferrite bead placed in the middle of the antenna.

In an embodiment of the lighting technology device, lighting technology device is an actor or a sensor.

In an embodiment of the lighting technology device, the NFC antenna is a multi-directional antenna.

In an embodiment of the lighting technology device, the two planar antenna wing elements comprise windings, wherein the windings from the two antenna wing elements are electrically connected with each other.

In an embodiment of the lighting technology device, the board is a printed circuit board, PCB, board.

According to a second aspect, the invention relates to a method for commissioning a lighting technology device, comprising: integrating an NFC antenna in a casing or arranging the NFC antenna on a board carrying a controller and a memory, wherein the antenna comprises two planar antenna wing elements arranged at an angle between 80° and 100°, preferably 85° to 95° with respect to each other, processing NFC data received from the antenna; and storing such data for programming the lighting technology device in said memory.

BRIEF DESCRIPTION OF THE DRAWINGS

The invention will be explained in the followings together with the figures.

FIG. 5 shows a method for commissioning a lighting technology device according to an embodiment.

DETAILED DESCRIPTION OF THE PREFERRED EMBODIMENTS

Figure 1:
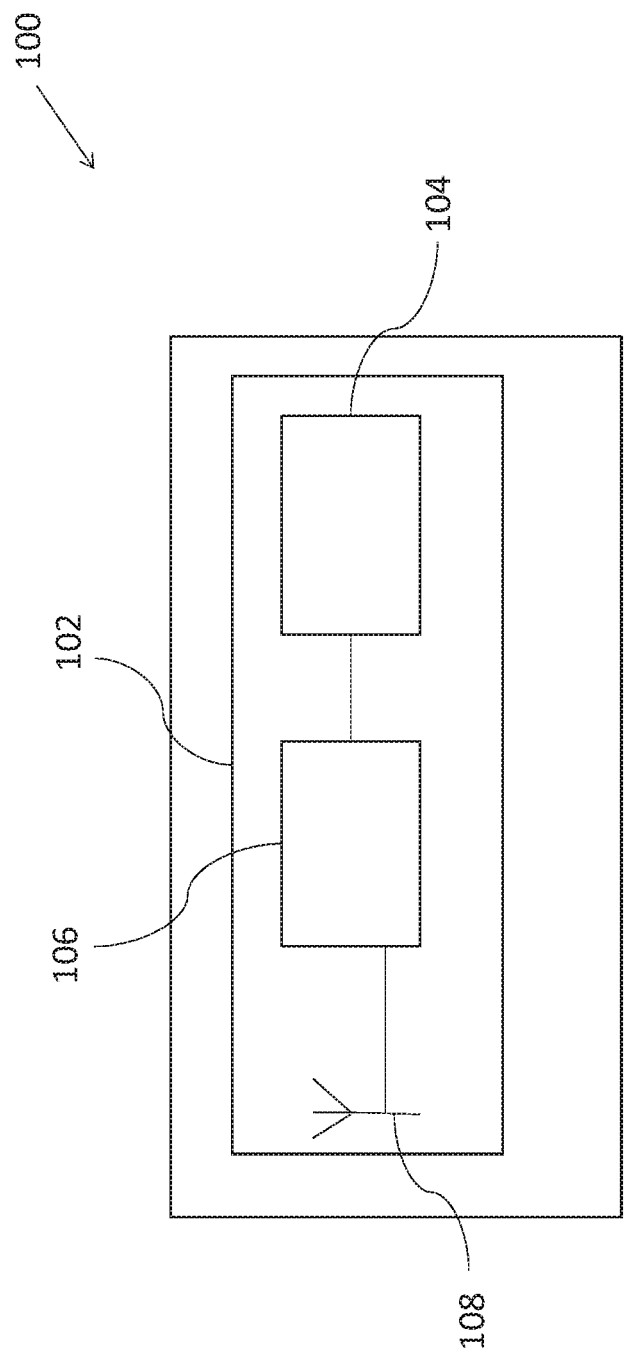
FIG. 1 shows a lighting technology device according to an embodiment.

Aspects of the present invention are described herein in the context of a lighting technology device.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a lighting technology device will be presented. However, as those skilled in the art will readily appreciate, these aspects may be extended to aspects of lighting technology devices without departing from the invention.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Now referring to FIG. 1, a lighting technology device 100 is shown according to an embodiment.

The lighting technology device 100 comprises a controller 104, a memory 106 functionally connected to the controller 104 and an NFC antenna 108 integrated in a casing or arranged on a board 102 carrying the controller 104 and the memory 106. The antenna 108 comprises two planar antenna wing elements 108a, 108b arranged at an angle between 80° and 100°, preferably 85° to 95° with respect to each other. Moreover, the controller 104 is configured to process NFC data received from the antenna 108 and store in said memory 106 said data for programming the lighting technology device 100.

In an embodiment, the lighting technology device 100 is an actor or a sensor.

Figure 2:
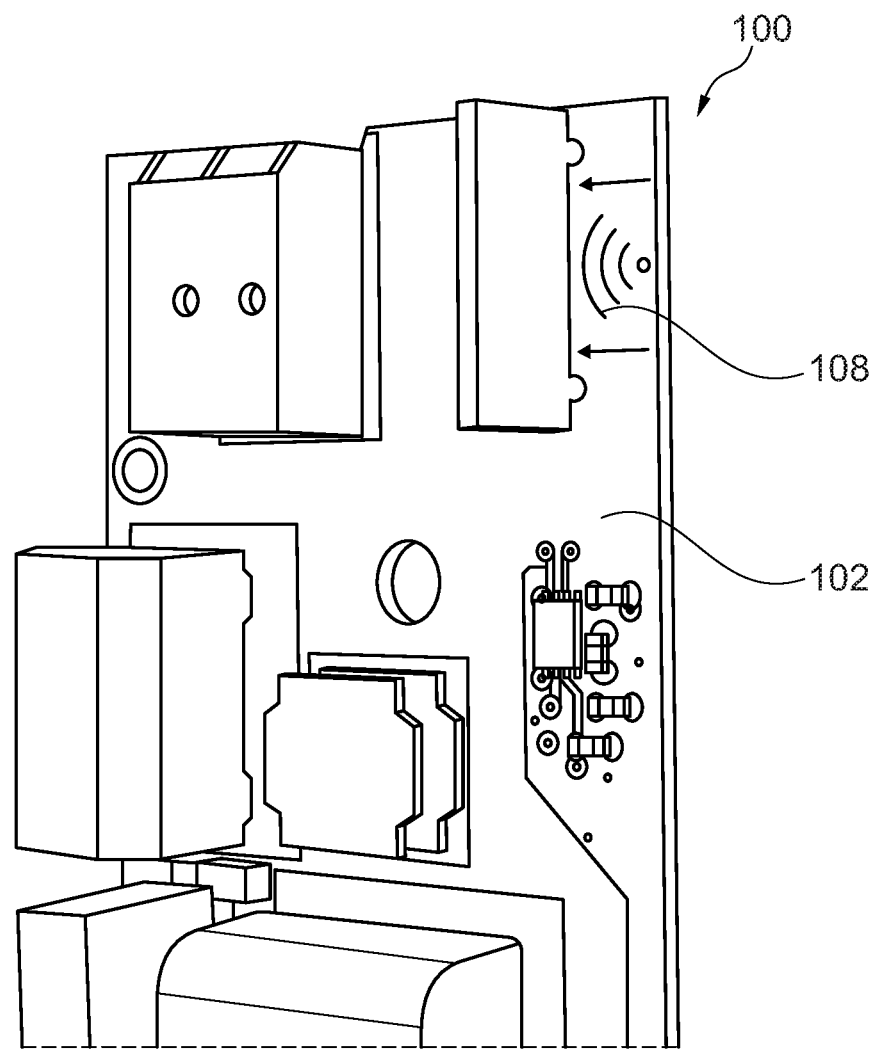
FIG. 2 shows a lighting technology device according to an embodiment.

FIG. 2 shows the lighting technology device 100 according to an embodiment.

In this embodiment, the antenna 108 is arranged on the board 102. The board 102 can be a printed circuit board, PCB, board.

Figure 3:
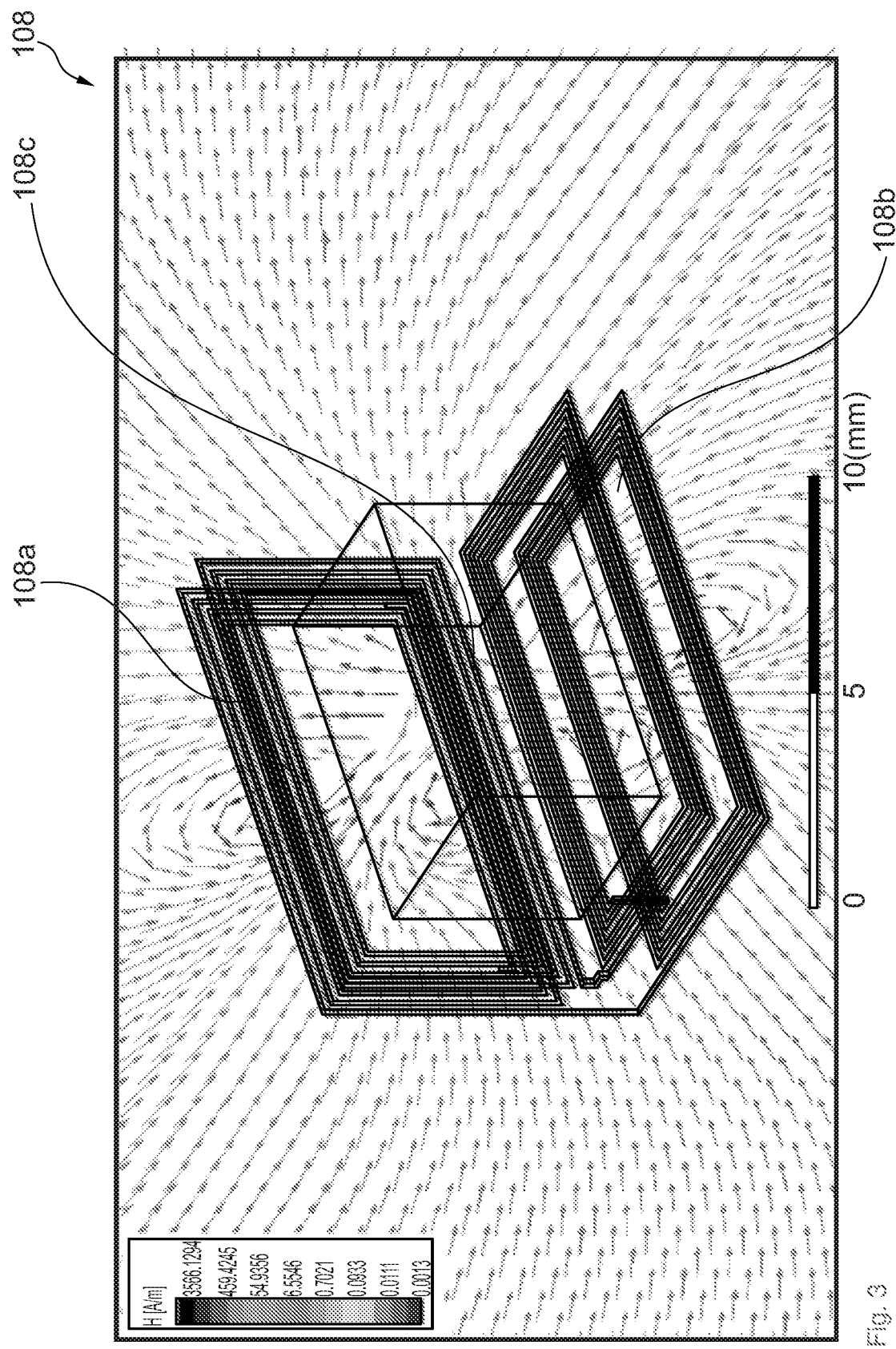
FIG. 3 shows an antenna for a lighting technology device according to an embodiment.
Figure 4:
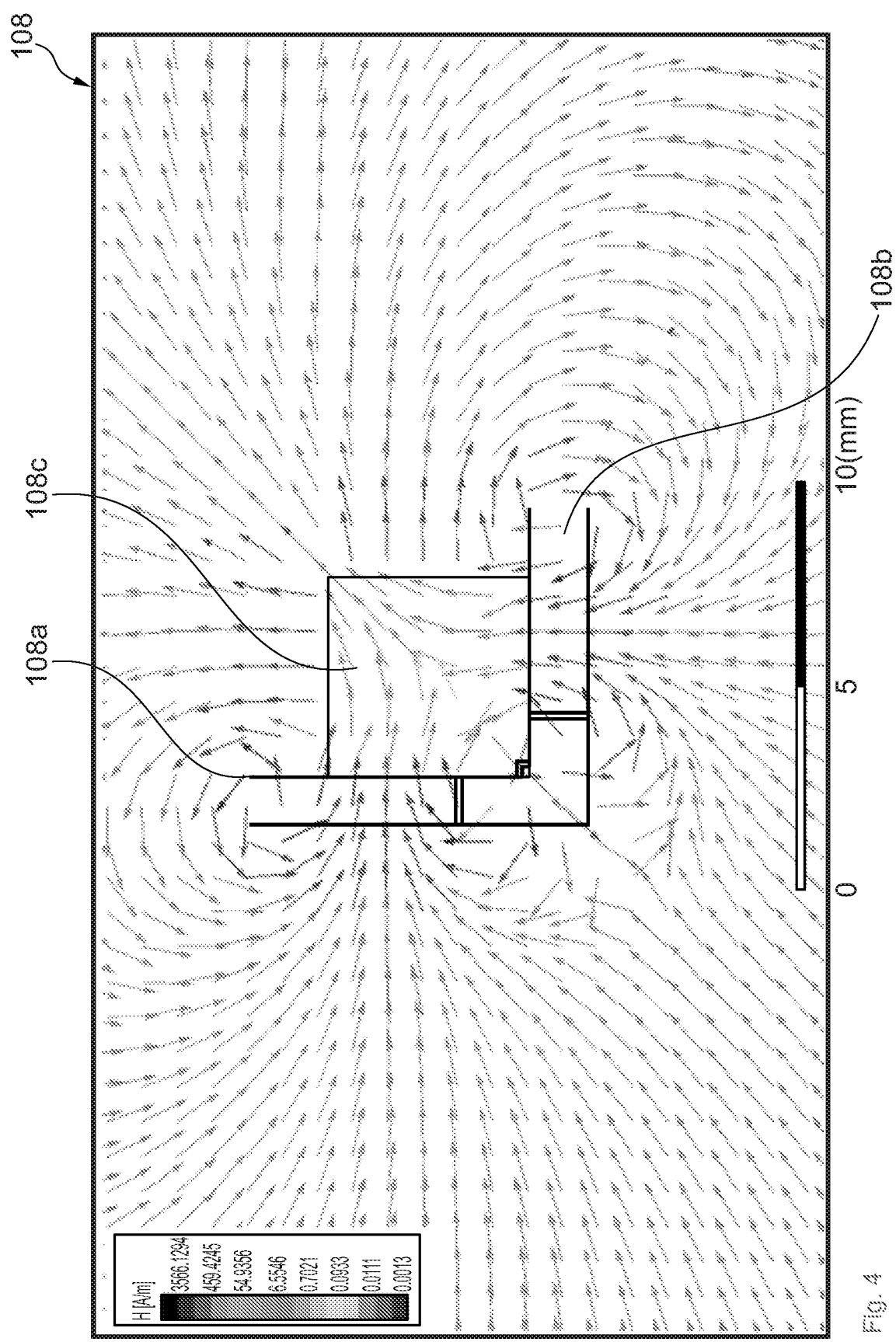
FIG. 4 shows an antenna for a lighting technology device according to an embodiment.

FIG. 3 shows the antenna 108 for the lighting technology device 100 according to an embodiment.

In this embodiment, the two planar antenna wing elements 108a, 108b are preferably arranged at an angle approximatively 90°.

Moreover, a ferrite core 108c is arranged between the two planar antenna wing elements 108a, 108b. The NFC antenna 108 can be a multi-directional antenna.

Furthermore, the two planar antenna wing elements 108a, 108b can comprise windings, wherein the windings from the two antenna wing elements 108a, 108b are electrically connected with each other.

This provides the advantage that the multi-directional possibilities of coupling the NFC antenna 108 of the writer and the reader are improved. Moreover, the NFC antenna 108 of the lighting device 100, especially a driver for lighting means, can have an angled configuration such that not only two configurations shifted by 180 degrees, but two additional configurations respectively shifted by 90 degrees can be used in order to couple the NFC antennas. This provides the advantage that the configuration process, for example at the end of the manufacturing of the lighting device 100, is facilitated. In order to have the angled configuration having two wings orientated respectively to each other by 90 degrees, either two antenna elements 108a, 108b are connected in this 90 degree wing configuration, or one antenna 108 is split to cover respectively one of the two wings angled by 90 degrees.

As an implementation, one antenna can already be provided on the PCB of the lighting device 100, and the second antenna element 108b is added in an angle of 90 degrees essentially at the same location of the first antenna element 108a.

In an embodiment, an antenna design is provided, wherein in the angle of the two antenna modules a ferrite core is arranged, which allows a reduction of the dimensions of the antenna.

FIG. 5 shows a method 500 for commissioning a lighting technology device according to an embodiment.

The method 500 comprises the steps of:
- integrating 501 an NFC antenna 108 in a casing or arranging the NFC antenna on a board 102 carrying a controller 104 and a memory 106,
  wherein the antenna 108 comprises two planar antenna wing elements 108a, 108b arranged at an angle between 80° and 100°, preferably 85° to 95° with respect to each other,
- processing 502 NFC data received from the antenna 108; and
- storing 503 such data for programming the lighting technology device 100 in said memory 106.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A lighting technology device (100), comprising:
a controller (104);
a memory (106) functionally connected to the controller (104); and
an NFC antenna (108) integrated in a casing of the device (104) or arranged on a board (102) of the device (100) carrying the controller (104) and the memory (106),
wherein the antenna (108) comprises two planar antenna wing elements (108a, 108b) arranged at an angle between 80° and 100° with respect to each other and a ferrite core (108c) is arranged between the two planar antenna wing elements (108a, 108b), and
wherein the controller (104) is configured to process NFC data received from the antenna (108) and store in said memory (106) said data for programming the lighting technology device (100).

2. The lighting technology device (100) of claim 1, wherein the two planar antenna wing elements (108a, 108b) are arranged at an angle approximatively 90°.

3. The lighting technology device (100) of claim 1, wherein the lighting technology device (100) is an actor or a sensor.

4. The lighting technology device (100) of claim 1, wherein the NFC antenna (108) is a multi-directional antenna.

5. The lighting technology device (100) of claim 1, wherein the two planar antenna wing elements (108a, 108b) comprise windings, wherein the windings from the two antenna wing elements (108a, 108b) are electrically connected with each other.

6. The lighting technology device (100) of claim 1, wherein the board (102) is a printed circuit board (PCB).

7. A method (500) for commissioning a lighting technology device (100), comprising:
integrating (501) an NFC antenna (108) in a casing or arranging the NFC antenna on a board (102) carrying a controller (104) and a memory (106),
wherein the antenna (108) comprises two planar antenna wing elements (108a, 108b) arranged at an angle between 80° and 100° with respect to each other and a ferrite core (108c) is arranged between the two planar antenna wing elements (108a, 108b),
transmitting NFC data from a portable NFC enabled device to the lighting technology device (100),
processing (502) NFC data received from the antenna (108); and
storing (503) such data for programming the lighting technology device (100) in said memory (106).

\* \* \* \* \*